(12) United States Patent
Kobayashi et al.

(10) Patent No.: US 8,945,767 B2
(45) Date of Patent: Feb. 3, 2015

(54) AQUEOUS COATING LIQUID FOR AN ELECTRODE PLATE, ELECTRODE PLATE FOR AN ELECTRICAL STORAGE DEVICE, METHOD FOR MANUFACTURING AN ELECTRODE PLATE FOR AN ELECTRICAL STORAGE DEVICE, AND ELECTRICAL STORAGE DEVICE

(75) Inventors: Nobuyuki Kobayashi, Tokyo (JP); Takanori Sannan, Tokyo (JP); Shinya Tsuchida, Tokyo (JP); Yoshihiko Iijima, Tokyo (JP)

(73) Assignee: Dainichiseika Color & Chemicals Mfg. Co., Ltd, Tokyo (JP)

( * ) Notice: Subject to any disclaimer, the term of this patent is extended or adjusted under 35 U.S.C. 154(b) by 83 days.

(21) Appl. No.: 13/392,066

(22) PCT Filed: Aug. 24, 2010

(86) PCT No.: PCT/JP2010/064264
§ 371 (c)(1),
(2), (4) Date: Feb. 23, 2012

(87) PCT Pub. No.: WO2011/024799
PCT Pub. Date: Mar. 3, 2011

(65) Prior Publication Data
US 2012/0148917 A1 Jun. 14, 2012

(30) Foreign Application Priority Data
Aug. 27, 2009 (JP) .................................. 2009-197036

(51) Int. Cl.
*H01M 4/04* (2006.01)
*C09D 5/24* (2006.01)
*H01G 11/38* (2013.01)
*H01M 4/13* (2010.01)
*H01M 4/139* (2010.01)
*H01M 4/62* (2006.01)
*H01M 4/66* (2006.01)
*C09D 101/28* (2006.01)
*C09D 103/08* (2006.01)
*C09D 105/04* (2006.01)
*C09D 105/08* (2006.01)
*C08L 1/28* (2006.01)
*C08L 3/08* (2006.01)
*C08L 5/04* (2006.01)
*C08L 5/08* (2006.01)
*H01G 11/26* (2013.01)
*H01G 11/28* (2013.01)
*H01M 4/583* (2010.01)
*H01M 10/0525* (2010.01)

(52) U.S. Cl.
CPC .................. *C09D 5/24* (2013.01); *H01G 11/38* (2013.01); *H01M 4/0404* (2013.01); *H01M 4/13* (2013.01); *H01M 4/139* (2013.01); *H01M 4/622* (2013.01); *H01M 4/667* (2013.01); *C09D 101/284* (2013.01); *C09D 101/286* (2013.01); *C09D 103/08* (2013.01); *C09D 105/04* (2013.01); *C09D 105/08* (2013.01); *C08L 1/284* (2013.01); *C08L 1/286* (2013.01); *C08L 3/08* (2013.01); *C08L 5/04* (2013.01); *C08L 5/08* (2013.01); *H01G 11/26* (2013.01); *H01G 11/28* (2013.01); *H01M 4/583* (2013.01); *H01M 4/625* (2013.01); *H01M 10/0525* (2013.01); *Y02E 60/122* (2013.01); *Y02E 60/13* (2013.01)
USPC ........................................................ 429/211

(58) Field of Classification Search
None
See application file for complete search history.

(56) References Cited

U.S. PATENT DOCUMENTS

| 5,521,292 | A | 5/1996 | Ueda et al. | |
|---|---|---|---|---|
| 2002/0160247 | A1* | 10/2002 | Tzeng et al. | 429/28 |
| 2003/0027046 | A1 | 2/2003 | Hosokawa et al. | |
| 2004/0092620 | A1 | 5/2004 | Kobayashi et al. | |
| 2004/0130038 | A1 | 7/2004 | Murakami et al. | |
| 2005/0225929 | A1 | 10/2005 | Murakami et al. | |
| 2006/0222952 | A1 | 10/2006 | Kono | |
| 2007/0109722 | A1 | 5/2007 | Ohmori | |

(Continued)

FOREIGN PATENT DOCUMENTS

| CN | 101116201 | 1/2008 |
|---|---|---|
| CN | 101806766 | 8/2010 |

(Continued)

OTHER PUBLICATIONS

Abe et al.: "Charge Transfer Reactions in Li-Ion Batteries" Journal of the Surface Science Society of Japan, 27(10), 609-612 (2006); English Abstract.

(Continued)

*Primary Examiner* — Patrick Ryan
*Assistant Examiner* — Wyatt McConnell
(74) *Attorney, Agent, or Firm* — Hamre, Schumann, Mueller & Larson, P.C.

(57) ABSTRACT

A water-based coating formulation for an electrode plate of an electricity storage device, said water-based coating formulation being adapted to form a coating film layer on the electrode plate, contains at least one resin binder having a saponification degree of 40% or higher and selected from unmodified and modified polyvinyl alcohols and unmodified and modified ethylene-vinyl alcohol copolymers, an electrically conductive material, and a specific polybasic acid or its acid anhydride in a water-based medium containing water as a polar solvent. Per parts by mass of the electrically conductive material (2), the resin binder is from 0.1 to 3 parts by mass and the polybasic acid or the like is from 0.01 to 6 parts by mass. The coating formulation has a solids content from 0.02 mass % to 40 mass %.

19 Claims, No Drawings

(56) References Cited

U.S. PATENT DOCUMENTS

| | | |
|---|---|---|
| 2008/0160405 A1 | 7/2008 | Yang et al. |
| 2009/0029255 A1 | 1/2009 | Ohmori |
| 2009/0257171 A1 | 10/2009 | Yamazaki et al. |
| 2009/0317718 A1 | 12/2009 | Imachi et al. |
| 2010/0291306 A1 | 11/2010 | Tsuchida et al. |
| 2011/0043966 A1 | 2/2011 | Kobayashi |
| 2011/0091771 A1* | 4/2011 | Sannan et al. ............. 429/217 |
| 2011/0133763 A1 | 6/2011 | Schulte et al. |
| 2011/0305970 A1* | 12/2011 | Sahai et al. ............. 429/492 |
| 2012/0156562 A1 | 6/2012 | Kobayashi et al. |
| 2012/0156563 A1 | 6/2012 | Kobayashi et al. |
| 2012/0160128 A1 | 6/2012 | Kobayashi et al. |

FOREIGN PATENT DOCUMENTS

| | | |
|---|---|---|
| EP | 1978056 | 10/2008 |
| EP | 2048726 | 4/2009 |
| EP | 2284235 | 2/2011 |
| JP | 63-10456 | 1/1988 |
| JP | 3-285262 | 12/1991 |
| JP | 5-194912 | 8/1993 |
| JP | 9-227633 | 9/1997 |
| JP | 11-297332 | 10/1999 |
| JP | 11-323175 | 11/1999 |
| JP | 2001-6436 | 1/2001 |
| JP | 2002-42817 | 2/2002 |
| JP | 2002-105241 | 4/2002 |
| JP | 2003-206409 | 7/2003 |
| JP | 2003-272619 | 9/2003 |
| JP | 2004-186221 | 7/2004 |
| JP | 2004-210980 | 7/2004 |
| JP | 2005-129437 | 5/2005 |
| JP | 2006-040595 | 2/2006 |
| JP | 2006-134777 | 5/2006 |
| JP | 2006-286344 | 10/2006 |
| JP | 2006-310010 | 11/2006 |
| JP | 2007-95641 | 4/2007 |
| JP | 2007-224263 | 9/2007 |
| JP | 2008-60060 | 3/2008 |
| JP | 2008-184485 | 8/2008 |
| JP | 2009-026744 | 2/2009 |
| JP | 2009-64564 | 3/2009 |
| JP | 2009-148681 | 7/2009 |
| JP | 2009-170287 | 7/2009 |
| JP | 2009-238720 | 10/2009 |
| JP | 2009-277783 | 11/2009 |
| JP | 2011-528794 | 11/2011 |
| TW | 200828658 | 7/2008 |
| TW | 200849699 | 12/2008 |
| TW | 200923032 | 6/2009 |
| WO | WO2007/086211 | 8/2007 |
| WO | WO2008/015828 | 2/2008 |
| WO | WO2008/123143 | 10/2008 |
| WO | WO2009/147989 | * 12/2009 |

OTHER PUBLICATIONS

Yoshitake et al.; SEI Films Obtained by the Addition of Functional Additives to Li-Ion Batteries, Journal of the Surface Finishing Society of Japan, 53(12), 887-889 (2002); English Abstract.

Nishina et al.: "Effects of Passivation Film at Aluminum Current Collector of Lithium Ion Secondary Batteries on Charging/Discharging Performance", Battery Technology, 15, 28-40 (2003); English Abstract.

Takada, Kazunori: "Improvement of high-rate capability of solid-state lithium-ion battery", Technical Research Report, The Institute of Electronics, Information and Communication Engineers, 107(493), 43-47 (2008); English Abstract.

Akatsuka, Yasumasa: "Development Trends of Environment-responsive Epoxy Resins", JETI, 50(9), 103-105 (2002); English Abstract.

Fujiyama: "New Mixing and Dispersion Technology for Conductive Fillers and Measures for Mixing and Dispersion Failures": Technical Information Institute Co., Ltd. p. 20 (2004); English Abstract.

Hashimoto et al.: "Electrolyte Thin Film Formation for Solid Oxide Fuel Cells Using Water-based Slurry Contained $Ce_{0.9}Gd_{0.1}O_{1.95}$ Nano-powder", ElectroChemistry, 77(2), 195-198 (2009); English Abstract.

Joe: "Technological Development of Dispersing Agents for Water Borne Coating Materials" JETI, 44(10), pp. 110-112 (1996); English Abstract.

Kamiya: "Characterization and control of aggregation and dispersion behavior of fine powder in aqueous suspension" 2(1), pp. 54-60; English Abstract.

Masamune, Kiyoshi: "Environmentally-friendly, Water-based Epoxy Resins", JETI, 50(9), 121-124 (2002); English Abstract.

Sakamoto et al.: "Processing of Dielectric Ceramic Sheets Using Aqueous Slurries", Materials Integration, 19(5), 25-33 (2006); English Abstract.

Tachibana: "Preparation. Coating and Drying of Positive Electrode Slurry for Lithium Ion Secondary Cells, and Understanding of Electrode Operations" Technical Information Institute Co., Ltd., 8(12), pp. 72-75 (2009); English Abstract.

* cited by examiner

AQUEOUS COATING LIQUID FOR AN ELECTRODE PLATE, ELECTRODE PLATE FOR AN ELECTRICAL STORAGE DEVICE, METHOD FOR MANUFACTURING AN ELECTRODE PLATE FOR AN ELECTRICAL STORAGE DEVICE, AND ELECTRICAL STORAGE DEVICE

TECHNICAL FIELD

This invention relates to a coating formulation for forming a coating film for its arrangement between a collector and an electrode active material layer, an electrode plate for an electricity storage device, and the electricity storage device including the electrode plate. More specifically, objects of this invention are to provide an electrode plate for an electricity storage device such as a secondary cell or capacitor, and also the electricity storage device including the electrode plate. The electrode plate can be obtained by forming and arranging a coating film of excellent solvent resistance with a specific coating formulation between a collector and an electrode active material layer (hereinafter called "the electrode layer") in the electricity storage device, and is effective for enhancing the adhesion between the collector and the electrode layer, decreasing the internal resistance, and also improving the cycle characteristics. The coating formulation is water-based, and hence, friendly to the environment, and moreover, enables the formation of coating films excellent in dispersion properties and solvent resistance.

BACKGROUND ART

In recent years, the miniaturization and weight reduction of electronic equipment and communication equipment have been rapidly progressing, and hence, there is also an increasing demand for miniaturization and weight reduction of electricity storage devices such as secondary cells used as drive power sources for such equipment. With a view to meeting such a demand, secondary cells having high energy density and high voltage, such as those represented by lithium ion secondary cells, have been developed and come into wide use as substitutes for conventional alkaline storage batteries, and further, electricity storage devices designed in attempts to achieve still higher capacitance and their members have also been proposed (Patent Documents 1 and 2).

On the other hand, larger electricity storage devices are desired for application in electric vehicles, hybrid vehicles and the like, but involve many problems for practical applications. In the case of lithium ion cells, for example, there is a problem in securing input/output characteristics that can provide them with safety to meet to an increase in an electrolyte as a combustible substance and can furnish them for practical applications. In addition to improvements in safety, increases in capacitance and output, therefore, also lie as problems of electricity storage devices to be solved from now on.

To realize providing an electricity storage device with higher capacitance and higher output, it is effective to lower the internal resistance. For this purpose, it is important to control the charge transfer phenomenon at each of interfaces between respective layers such as an electrode layer, collector and electrolyte layer (Non-patent Documents 1 and 2), and a variety of proposals have been made.

At an interface of a graphite negative electrode in a lithium ion cell, for example, a surface resistance film formed by decomposition of an electrolyte, decomposition of a lithium-containing compound as a supporting salt or the like and called "an SEI film" gives serious effects on the maintenance of the performance of the cell. The addition of catechol carbonate or, its derivative to the electrolyte, however, results in an SEI film of smaller thickness, and hence, of lower film resistance (Non-patent Document 2).

In a lithium ion cell, an aluminum positive electrode collector forms a barrier film on its surface and is passivated in a fluorine-containing electrolyte, and this passive film affects the cycle characteristics. It has, however, been succeeded in imparting conductivity to such a passive film by subjecting an aluminum collector to heat treatment and applying a dispersion of ultrafine particulate carbon onto the heat-treated aluminum collector (Non-patent Document 3).

For improvements in safety, on the other hand, all-solid-state lithium ion cells making use of nonflammable electrolytes are drawing interest as electricity storage devices equipped with safety. These all-solid-state lithium ion cells are, however, accompanied by a drawback in that their output performance is still not sufficient. A report has been made recently that various problems associated with an interface between an electrode layer and an electrolyte layer, said interface taking a part in the rate-controlling step of a power output, was studied to solve the above-mentioned drawback, and based on the results of the study, an attempt was then made to interpose an oxide solid electrolyte as a buffer layer between the electrode layer and the electrolyte layer, leading to significant improvements in output performance (Non-patent Document 4).

In electricity storage devices containing solid electrolytes, fluorinated polymers the electrical conductivities of which are close to those of liquid electrolytes are used. These fluorinated polymers, however, involve a problem that they do not sufficiently come into close contact with collector metals. A proposal is thus disclosed, in which a collector is coated with an acid-modified polyolefin to solve the above-mentioned problem, and in addition, also to maintain excellent cycling characteristics (Patent Document 3).

In these proposals, however, the problems to be solved are limited to those arising under specific conditions. Many of them are, therefore, limited and individual solutions. As a reason for this situation, there are presumably still many unknown matters in the phenomena of charge transfer and ion transfer at the interfaces between the respective layers in an electricity storage device (Non-patent Document 3). Taking practical utility as a first essential point under these circumstances, the present inventors came to consider that it would be necessary to broaden the point of view, to take the phenomenon between each two constituent units in an electricity storage device as a single system including their interface, to study the reasonability of this system, and to attempt solutions to problems.

As a primary "system including an interface" in an electricity storage device, there is each electrode plate. Each electrode plate gives considerable effects on the performance of the electricity storage device, and is an electrode member with unit members such as an electrode layer and collector integrated therein. Concerning such an electrode plate, proposals have been made to permit its production in the form of a thinner film with larger area such that it can be provided with an extended charge-discharge cycle life and an increased energy density. As to lithium ion cells, for example, Patent Document 4, Patent Document 5, etc. disclose positive electrode plates each of which is obtained by dispersing or dissolving an electrically conductive material (hereinafter referred to as a "conductive material") and binder along with powder of a positive-electrode active material such as a metal oxide, sulfide or halogenide in an appropriate solvent to prepare a paste-form coating formulation, providing as a substrate a collector formed of a foil of a metal such as aluminum, and applying the coating formulation onto a surface of the substrate to form a coating film layer.

A capacitor, which makes use of an electric double-layer formed at an interface between a polarizable electrode plate and an electrolyte, is used as a memory backup power supply, and its use in fields that require large outputs like a power source for an electric car is also attracting interests. For large outputs, this capacitor is hence required to have both a high capacitance and a low internal resistance. Like a negative electrode plate for the above-described cell, the electrode plate for the capacitor is produced by applying onto a collector a coating formulation, which is generally a mixture of a binder and conductive material, and then drying the coating formulation.

As the binder for use in the coating formulation for the electrode plates in the above-described electricity storage device such as the lithium ion cell or capacitor, a fluorinated resin such as polyfluorinated vinylidene or a silicone-acrylic copolymer is used, for example. A negative electrode plate (cell) or polarizable electrode plate (capacitor) is obtained by adding a solution of a binder in a suitable solvent to an active material such as a carbonaceous material to prepare a paste-form coating formulation and then applying the coating formulation onto a collector. In the above-described coated electrode plate, the binder employed to prepare the coating formulation is required to be electrochemically stable to a nonaqueous electrolyte and to be free from dissolution into the electrolyte of the cell or capacitor, to remain free from substantial swelling by the electrolyte, and further to be soluble in a certain solvent to permit the coating.

On the other hand, it is practiced to form a protective film on a surface of a metal material such as aluminum, as a base metal material of a collector, by coating a solution of one of various resins. The resulting film is excellent in the adhesiveness to the metal surface, but is accompanied by a problem in that its durability to an organic solvent is insufficient.

In the electrode plate for the cell or capacitor, said electrode plate having been obtained by applying the above-described coating formulation onto the surface of an aluminum foil, copper foil or the like as the collector, the coating film layer formed by the coating and drying is accompanied by problems in that its adhesiveness to the collector and its flexibility are insufficient, the contact resistance between itself and the collector is high, and peeling, flaking, cracking and/or the like of the coating film layer takes place during assembly steps of the cell or capacitor or upon charging and discharging the same.

As described above, the conventional cell or capacitor is accompanied by the problems of the poor adhesion between the electrode layer and the collector (substrate) and the high internal resistance at the interface between the electrode layer and the substrate. A variety of coating formulations have been proposed to solve these problems. Coating film layers formed from these coating formulations lessen the adhesiveness problem, but make still higher the resistances between the electrode layers and the collectors. Therefore, none of these coating formulations have led to a solution to the problems yet. In recent years, there is also an increasing demand for the manufacture of the above-described electricity storage devices such as lithium ion cells and electric double-layer capacitors and their related products with due consideration being paid to the environment. There is hence a demand for a coating formulation and electricity storage device each of which uses components, materials and a preparation or manufacturing method that do not add much load on the environment load.

PRIOR ART DOCUMENTS

Patent Documents

Patent Document 1: JP-A-2006-310010
Patent Document 2: JP-A-2007-95641
Patent Document 3: JP-A-11-297332
Patent Document 4: JP-A-63-10456
Patent Document 5: JP-A-3-285262

Non-Patent Documents

Non-patent Document 1: TAKESHI, Abe; OGUMI, Zenpachi: "Charge Transfer Reactions in Li-Ion Batteries" in Japanese, Journal of The Surface Science Society of Japan, 27(10), 609-612 (2006)
Non-patent Document 2: YOSHITAKE, Hideya; ISHIHARA, Tatsumi; YOSHIO, Masaki: "SEI Films Obtained by the Addition of Functional Additives to Li-Ion Batteries" in Japanese, Journal of The Surface Finishing Society of Japan, 53(12), 887-889 (2002)
Non-patent Document 3: NISHINA, Tatsuo; TACHIBANA, Kazuhiro; ENDO, Takashi; OGATA, Tateaki: "Effects of Passivation Film at Aluminum Current Collector of Lithium Ion Secondary Batteries on Charging/Discharging Performance" in Japanese, Battery Technology, 15, 28-40 (2003)
Non-patent Document 4: TAKADA, Kazunori: "Improvement of high-rate capability of solid-state lithium-ion battery" in Japanese, Technical Research Report, The Institute of Electronics, Information and Communication Engineers, 107(493), 43-47 (2008).

DISCLOSURE OF THE INVENTION

Problem to be Solved by the Invention

The present invention has been made with the foregoing circumstances in view. Objects of the present invention are, therefore, to overcome the above-described problems of the conventional technologies, and to enable the provision of the below-described electrode plate for an electricity storage device and the electricity storage device including the electrode plate. This electrode can be obtained by forming a coating film between a collector formed of an aluminum foil, copper foil or the like and an electrode layer with a water-based coating formulation, which does not add much load on the environment, such that the coating film can be arranged as an undercoat of excellent solvent resistance and electrical characteristics between the collector and the electrode layer; and the electrode layer is provided with excellent adhesiveness to the collector and superb resistance to an electrolyte, and is also improved in the contact resistance between itself and the collector.

Means for Solving the Problem

The above-described objects can be achieved by the present invention to be described below. As a result of enthusiastic research conducted by the present inventors to achieve the above-described objects, it was found effective to arrange, between a collector and an electrode layer, a coating film comprised of a specific resin binder, conductive material and polybasic acid or the like (including a derivative of the polybasic acid) as essential components. The present inventors then found a composition suited as a coating formulation for forming such a coating film layer on an electrode plate in an electrode storage device, leading to the completion of the present invention.

Described specifically, the present invention provides a water-based coating formulation for an electrode plate of an electricity storage device, said water-based coating formulation being adapted to form a coating film layer on the electrode plate, comprising: in a water-based medium containing at least water as a polar solvent, (1) as a resin binder, at least one resin having a saponification degree of 40% or higher and selected from the group consisting of unmodified polyvinyl alcohol, modified polyvinyl alcohols, unmodified ethylene-vinyl alcohol copolymer and modified ethylene-vinyl alcohol copolymers, (2) a conductive material, and (3) at least one polybasic acid selected from the group consisting of 1,2,3,4-butanetetracarboxylic acid, pyromellitic acid, citric acid, ethylenediaminetetraacetic acid, 1,2,3-propanetricarboxylic acid, 1,2,4-cyclohexanetricarboxylic acid, 1,2,4,5-cyclohexanetetracarboxylic acid, trimellitic acid, 1,4,5,8-naphthalenetetracarboxylic acid and 1,2,3,4,5,6-cyclohexanehexacarboxylic acid, or an acid anhydride thereof (hereinafter called the "polybasic acid or the like), wherein as proportions of the components (1) to (3), the resin binder (1) is from 0.1 to 3 parts by mass and the polybasic acid or the like (3) is from 0.01 to 6 parts by mass, both, per parts by mass of the conductive material (2), and the coating formulation has a solids content of from 0.02 mass % to 40 mass %.

The water-based coating formulation according to the present invention for the electricity storage device may be practiced preferably in the following embodiments: the water-based coating formulation further comprises preferably at least one additive resin selected from the group consisting of homopolymer (polyvinylpyrrolidone) of vinylpyrrolidone as a constituent monomer, copolymers of vinylpyrrolidone as an essential constituent monomer, chitosan and chitosan derivatives; the polybasic acid is preferably 1,2,3,4-butanetetracarboxylic acid or pyromellitic acid, or an acid anhydride thereof; the water-based coating formulation preferably has a surface resistivity of 3,000Ω/□ or lower when a coating film is formed to a thickness of 4 μm on a glass plate, heated at 200° C. for 1 minute, cooled to 30° C., and then measured in accordance with JIS K 7194; the water-based coating formulation preferably has a viscosity, at 25° C. of from 100 to 10,000 mPa·s when measured at a rotational speed of 60 rpm by a Brookfield rotational viscometer with a rotor number of from 2 to 4, and a pH of 6 or lower when measured at 25° C. after the coating formulation has been diluted with distilled water of the same weight; the conductive material preferably comprises any one or more of acetylene black, Ketjenblack, carbon nanofibers, carbon nanotubes and other carbonaceous conductive aids; a medium other than water in the water-based medium is preferably at least one medium selected from the group consisting of methyl alcohol, ethyl alcohol, isopropyl alcohol, N-methyl-2-pyrrolidone, dimethyl sulfoxide, dimethylacetamide, and N,N-dimethylformamide; and a 1 μm thick dry coating film obtained by drying the coating formulation with air of 60° C. is preferably soluble in boiling water, and preferably satisfies a relationship of $((X-Y)/X) \times 100 \leq 5\%$ where X indicates a mass of a coating film after the dry coating film has been heated further at 150° C. or higher for 30 minutes or longer and Y designates a mass of the dry coating film after the dry coating film has been boiled for 10 minutes in boiling water subsequent to the heating.

The present invention also provides an electrode plate for an electricity storage device, comprising a collector, an electrode active material layer, and a coating film formed from any one of the above-described water-based coating formulations and arranged between the collector and the electrode active material layer.

The electrode plate according to the present invention for the electricity storage device may be practiced preferably in the following embodiments: the coating film has been formed by heat treatment at from 100 to 250° C., and has a thickness of from 0.1 to 10 μm in terms of solids; the collector is an aluminum foil, and the electrode active material layer comprises a positive-electrode active material; the collector is a copper foil, and the electrode active material layer comprises a negative-electrode active material; and the collector is an aluminum foil, and the electrode active material layer comprises a polarizable electrode.

The present invention also provides a process for producing an electrode plate for an electricity storage device, which comprises applying any one of the above-described water-based coating formulations onto a surface of a collector to form a coating film, and then forming an electrode active material layer on the coating film.

Upon forming the coating film in the process according to the present invention for the production of the electrode plate for the electricity storage device, heat treatment is conducted at 100° C. or higher but 250° C. or lower for 1 second or longer but 60 minutes or shorter after or while eliminating the water-based medium under heat subsequent to the application of the coating formulation.

The present invention also provides an electricity storage device comprising any one of the above-described electrode plates. The electricity storage device can be a secondary cell, nonaqueous lithium ion cell, or a capacitor, and the capacitor can be an electric double-layer or lithium ion capacitor.

Advantageous Effects of the Invention

Despite the water-based coating formulation contains as a binder the polymer that does not add much load on the environment, the present invention makes it possible to arrange, with the coating formulation, a coating film (thin film), for example, between a collector and an electrode layer, which make up an electrode plate for an electricity storage device, such that an undercoat layer excellent in the adhesiveness to a surface of a metal material such as an aluminum material and also in solvent resistance can be provided. As a consequence, the electrode layer is arranged with excellent adhesiveness to the collector formed of an aluminum foil, copper foil or the like and also with superb resistance to an electrolyte, and is improved in the contact resistance between itself and the collector, thereby making it possible to provide an electrode plate of excellent properties and characteristics for an electricity storage device, such as an electrode plate of excellent properties and characteristics for a cell or a polarizable electrode plate of excellent properties and characteristics for a capacitor, and also the electricity storage device including the electrode plate.

MODES FOR CARRYING OUT THE INVENTION

The present invention will next be described in further detail based on preferred modes for carrying out the invention.

Both of the polyvinyl alcohol (hereinafter "PVA") and ethylene-vinyl alcohol copolymer (hereinafter "EVOH") useful as resin binders in the present invention are polymers that do not add much load on the environment, and compared with conventional resin binders, give a smaller impact on the environment. The present inventors found that a water-based slurry composition, which had been prepared by selecting one having a specific saponification degree from these materials and the like, adding a conductive material such as a carbonaceous filler and a polybasic acid or the like having a resin hardening function to it, and incorporating them in specific proportions, is useful especially as a coating formulation for a coating film to be formed on an electrode plate for an electricity storage device. That finding has then led to the completion of the present invention. Specifically, the present inventors have found that the above-described, significant advantageous effects of the present invention can be obtained, for example, by applying the coating formulation between a collector and an electrode layer for an electricity storage device and using the resulting coating film (thin film) as an undercoat layer. More specifically, the present inventors found that by applying the coating formulation of the present invention, which does not add much load on the environment, to a thickness of from 0.1 to 10 μm, preferably from 0.1 to 5 μm, more preferably from 0.1 to 2 μm in terms of solids as an undercoat layer on a surface of a collector and forming a positive electrode layer for a cell, a negative electrode layer for the cell or a positive electrode layer or negative electrode layer for an electric double-layer capacitor over the undercoat layer, the adhesiveness between the electrode layer and the collector can be, significantly improved without increasing the resistance at all between the electrode layer and the collector but while rather lowering the resistance. That finding has then led to the present invention.

In the present invention, there are also provided a water-based coating formulation for forming coating film layers (undercoat layers) on electrode plates for an electricity storage device; electrode plates for a cell or capacitor, said electrode plates being each characterized in that a coating film formed from the coating formulation is arranged between a collector and an electrode layer; and a secondary cell) or capacitor characterized by having the electrode plates.

In the present invention, at least one resin having a saponification degree of 40% or higher and selected from the group consisting of unmodified polyvinyl alcohol, modified polyvinyl alcohols, unmodified ethylene-vinyl alcohol copolymer and modified ethylene-vinyl alcohol copolymers is used as a resin binder. The use of such a resin can decrease the load on the environment, and in addition, can bring about the below-described advantageous effects. Conventionally, binders such as polyfluorinated vinylidene, polytetrafluoroethylene, acrylic resins, polyimide resins, polyamide-imide resins, silicone-acrylic resins, and styrene-butadiene copolymer rubber have been used. Because of the use of such a binder, it has heretofore been essential to subject, for example, the surface of an aluminum foil to chemical treatment to provide improved adhesion between the electrode layer and the collector. However, the use of the coating formulation according to the present invention can obviate such cumbersome and high cost chemical treatment, and can realize still better adhesion and lower resistance. As a consequence, high-efficiency and long-life, cells and capacitors can be provided.

<Coating Formulation>

The coating formulation according to the present invention contains, in a water-based medium containing at least water as a polar solvent, (1) a resin binder having a saponification degree of 40% or higher and selected from PVA or EVOH (hereinafter "the PVA-based resin"), (2) a conductive material and (3) a polybasic acid or an acid anhydride thereof (a polybasic acid or the like), the proportions of these components (1) to (3) are such that the resin binder (1) is from 0.1 to 3 parts by mass and the polybasic acid or the like (3) is from 0.01 to 6 parts by mass, both, per parts by mass of the conductive material (2), and the coating formulation has a solids content of from 0.02 mass % to 40 mass %. The above-described components will hereinafter be described in detail. It is, however, to be noted that the coating formulation according to the present invention can contain (4) a polymerization product of vinylpyrrolidone, chitosan or a derivative thereof, as needed, in addition to the above-described resin binder.

Polymers having hydroxyl groups or amino groups in their molecules, such as cellulose, starch, chitin, chitosan, alginic acid, PVA, EVOH, polyallylamine and polyvinylamine, are known to afford films having excellent adhesiveness to metal materials such as aluminum. However, these films involve a problem in that they swell, for example, with a polar solvent such as water or N-methylpyrrolidone and readily separate from the surfaces of such metal materials. Further, the use of such a polymer as a binder in a coating formulation for the production of electrode plates involves a problem in that the durability of the resulting coating film layer to a cell electrolyte such as ethylene carbonate or propylene carbonate is low, although the adhesiveness of the coating film layer to the collector is excellent.

Interested in PVA-based resins out of the above-described polymers in that they do not add much load on the environment, the present inventors conducted research with a view to providing films, which are to be formed from the PVA-based resins, with improved resistance to organic solvents. As a result, it has been found that a coating formulation—which is prepared by adding a PVA-based resin together with a polybasic acid or the like to a water-based medium—can form a film having excellent adhesiveness to the surface of a metal material and superb solvent resistance. It has also been found that, when the coating formulation of the above-described composition making use of the PVA-based resin as a binder is applied and then heated to form a coating film layer, the polybasic acid or the like employed in combination acts as a crosslinking agent for the PVA-based resin during drying under heat and the film formed from the PVA-based resin is no longer equipped with solubility and swellability to an organic solvent and electrolyte and exhibits excellent adhesiveness to the surface of a metal material or a collector and superb solvent resistance.

(1) PVA-Based Resin

The PVA-based resin for use in the present invention may be unmodified PVA or a modified PVA. Unmodified PVA is a known resin available by saponifying polyvinyl acetate. Any known unmodified PVA can be used in the present invention insofar as its saponification degree is 40% or higher. The use of one having a saponification degree of from 70 to 100% is preferred. It is particularly preferred to use unmodified PVA having a polymerization degree of from 300 to 5,000 and a saponification degree of from 70 to 100%. As such unmodified PVA, those of various grades are available from the market under trade names such as "KURARAY POVAL" (product of Kuraray Co., Ltd.), "GOHSENOL" (product of Nippon Synthetic Chemical Industry Co., Ltd.), "DENKA POVAL" (product of Denki Kagaku Kogyo Kabushiki Kaisha", and "J-POVAL" (product of Japan VAM & POVAL Co., Ltd.), and are usable.

The modified PVA for use in the present invention is one available by introducing functional groups other than hydroxyl groups or acetate groups in the above-described unmodified PVA. Illustrative are carboxyl-modified PVA, carbonyl-modified PVA, silanol-modified PVA, amino-modified PVA, cation-modified PVAs, sulfonic-modified PVA, acetoacetyl-modified PVA, and the like. As these PVAs, a variety of modified PVAs are available from the market, for example, under trade names such as "GOHSERAN" (sulfonic-modified PVA), "GOHSEFIMER K" (cation-modified PVA), "GOHSEFIMER Z" (acetoacetyl-modified PVA), and "GOHSENAL" (carboxyl-modified PVA) (products of Nippon Synthetic Chemical Industry Co., Ltd.); "D POLYMER" (carbonyl-modified PVA) and "A SERIES" (carboxyl-modified PVA) (products of Japan VAM & POVAL Co., Ltd.); and "KURARAY C POLYMER" (cation-modified PVA)(product of Kuraray Co., Ltd.), and are usable.

The EVOH for use in the present invention may be unmodified EVOH or a modified EVOH. Unmodified PVA is a known resin available by saponifying a copolymer of ethylene and vinyl acetate, and in the present invention, EVOH having a saponification degree of 40% or higher is used. Preferably, one having a saponification degree of from 70 to 100% is used. In particular, a copolymer having a copolymerized ethylene content of 60 mole % or lower, more preferably a copolymer having a copolymerized ethylene content of 50 mole % or lower, still more preferably unmodified EVOH having a copolymerized ethylene content of 40 mole % or lower is used. A saponification degree of lower than 40% leads to reduced adhesiveness to a collector, and therefore, is not preferred. The use of one having a polymerization degree of from 300 to 5,000 is preferred. As such unmodified EVOH, those of various copolymerized ethylene contents are available from the market under trade names such as "EVAL" (registered trademark, product of Kuraray Co., Ltd.), and therefore, they can be used.

Modified EVOHs usable in the present invention can be obtained, for example, following the production process described in JP-A-9-227633. As an alternative, they are available from the market, and may then be used as they are.

(2) Conductive Material

The coating formulation according to the present invention contains a conductive material as an essential component. Conductive materials usable in the present invention include acetylene black, Ketjenblack, graphite, furnace black, carbon nanofibers, monolayer or multilayer carbon nanotubes, and the like. The use of such a conductive material can provide the resulting coating film with a further improved electrical contact, and can also provide the resulting electrode layer with a reduced internal resistance and an increased capacity density.

(3) Polybasic Acid or the Like

The coating formulation according to the present invention contains a polybasic acid or an acid anhydride thereof as an essential component. As the polybasic acid or the like for use in the present invention, it is preferred to use a tribasic or higher polybasic acid from the standpoint of crosslinking ability for the above-described PVA-based resin to be used as a resin binder. Described specifically, at least one polybasic acid, which is selected from the group consisting of the below-described polybasic acids, or its acid anhydride can be used.

<Tribasic Acids> Citric Acid,
1,2,3-propanetricarboxylic acid,
1,2,4-butanetricarboxylic acid,
2-phosphono-1,2,4-butanetricarboxylic acid, trimellitic acid, and 1,2,4-cyclohexanetricarboxylic acid;
<Tetrabasic Acids> Ethylenediaminetetraacetic Acid,
1,2,3,4-butanetetracarboxylic acid, pyromellitic acid,
1,2,4,5-cyclohexanetetracarboxylic acid, and
1,4,5,8-naphthalenetricarboxylic acid; and
<Hexabasic Acids>
1,2,3,4,5,6-Cyclohexanehexacarboxylic acid.

It is to be noted that in addition to the above-described polybasic acids, other polybasic acids such as those to be described below may also be used in combination in the present invention. Illustrative are tribasic acids such as isocitric acid, aconitic acid, nitrilotriacetic acid, hydroxyethylethylenediaminetriacetic acid, carboxyethylthiosuccinic acid, and trimesic acid; monocyclic tetracarboxylic acids such as ethylenediamine-N,N'-succinic acid, 1,4,5,8-naphthalenetetracarboxylic acid, pentenetetracarboxylic acid, hexenetetracarboxylic acid, glutamate diacetic acid, maleated methylcyclohexenetetracarboxylic acid, furantetracarboxylic acid, benzophenonetetracarboxylic acid, phthalocyaninetetracarboxylic acid, 1,2,3,4-cyclobutanetetracarboxylic acid, and cyclopentanetetracarboxylic acid; tetrabasic acids such as polycyclic tetracarboxylic acids having a bicyclo ring, norbornane ring or tetracycloring structure, represented by bicyclo[2,2,1]heptane-2,3,5,6-tetracarboxylic acid and bicyclo[2,2,2]octane-2,3,5,6-tetracarboxylic acid; pentabasic acids such as diethylenetriamine pentaacetic acid; phthalocyanine polycarboxylic acid, phytic acid, hexametaphosphoric acid, polyphosphoric acid, polyacrylic acid, polymethacrylic acid, polyitaconic acid, polymaleic acid, and copolymers thereof; styrene-maleic acid copolymer, isobutylene-maleic acid copolymer, vinyl ether-maleic acid copolymer, pectic acid, polyglutamic acid, polymalic acid, polyaspartic acid, acrylic acid-maleic acid-vinyl alcohol copolymer; and the like.

(Composition)

The coating formulation according to the present invention can be obtained by adding the PVA-based resin and conductive material and the above-described polybasic acid or the like to the water-based medium and kneading the resulting mixture. As the proportions of the respective components in the coating formulation according to the present invention, when the conductive material is assumed to be 1 parts by mass, the PVA-based resin may be preferably from 0.1 to 3 parts by mass, more preferably from 0.3 to 2 parts by mass and the polybasic acid or the like may be preferably from 0.01 to 6 parts by mass, more preferably from 0.1 to 3 parts by mass. Further, the solids content of the coating formulation may range preferably from 0.02 mass % to 40 mass %, more preferably from 0.02 mass % to 35 mass %, still more preferably from 0.1 mass % to 30 mass % per 100 mass % of the whole amount.

The content of the polybasic acid or the like in the coating formulation according to the present invention may be preferably from 1 to 300 parts by mass or so, more preferably from 10 to 200 parts by mass per 100 parts by mass of the polymers including the PVA-based resin. If the content of the polybasic acid or the like is lower than 1 parts by mass, no sufficient crosslinking degree is available, the crosslinked PVA-based resin is provided with a low crosslink density, and the resulting coating film layer as an undercoat layer is insufficient in the adhesiveness to the collector, and the crosslinked PVA-based resin is insufficient in insolubility, non-swellability and electrochemical stability to the electrolyte. If the above-described content exceeds 300 parts by weight, on the other hand, the resulting film or the coating film layer is provided with reduced flexibility, and moreover, such an excessively high content is uneconomical.

As the proportions of the respective components in the coating formulation according to the present invention, it is preferred to incorporate the components in the below-described ranges, respectively, when the coating formulation is assumed to be 100 parts by mass. The polymers including the PVA-based resin may be preferably from 1 to 40 parts by mass, more preferably from 1 to 20 parts by mass, still more preferably from 5 to 10 parts by mass. The polybasic acid or the like may be preferably from 0.2 to 20 parts by mass, more preferably from 2 to 10 parts by mass, and the conductive material may be preferably from 0.1 to 30 parts by mass, more preferably from 0.1 to 20 parts by mass, still more preferably from 2 to 15 parts by mass. Further, the solids content of the coating formulation may range preferably from 1 to 35 mass %.

In the foregoing, if the content of the polymers including the PVA-based resin component is lower than 1 parts by mass when the whole coating formulation is assumed to be 100 parts by mass, the resulting coating film layer may be provided with insufficient strength and insufficient adhesiveness to the collector. If the concentration exceeds 40 parts by mass, on the other hand, it becomes difficult to obtain a uniform solution. If the content of the polybasic acid or the like is lower than 0.2 parts by mass, the resulting coating film layer may be provided with insufficient strength, insufficient adhesiveness to the collector and insufficient electrochemical stability to the electrolyte. If the content of the polybasic acid or the like exceeds 20 parts by mass, on the other hand, the resulting coating film layer may be provided with lowered flexibility. Contents of the polymers including the PVA-based resin and those of the polybasic acid or the like outside the above-described corresponding ranges are not preferred accordingly.

The content of the conductive material in the coating formulation according to the present invention is from 0.1 to 30 parts by mass when the whole coating formulation is assumed to be 100 parts by mass, although it varies depending on the application field. If the content of the conductive material is smaller than 0.1 parts by mass, the resulting coating film layer may be insufficient in conductivity. If the content of the conductive material exceeds 30 parts by mass, on the other hand, one or more of the remaining components may become insufficient so that the resulting coating film layer may be reduced in performance.

As such a polybasic acid or the like as mentioned above for use in the present invention, those available on the market can be used as they are, or may be used after purification as needed. As the order of addition of the PVA-based resin and polybasic acid or the like to the water-based medium upon dissolving them in the water-based medium in the production of a solution of the PVA-based resin employed as a resin binder in the present invention, either of the PVA-based resin and the polybasic acid or the like may be added first or both of them may be added concurrently. As a dissolution method, room-temperature stirring is sufficient, but heating may also be conducted as needed. Dissolution under heating at 80° C. or higher is preferred.

(4) Other Resins which May be Added

In the water-based coating formulation according to the present invention, the homopolymer (polyvinylpyrrolidone) obtained from vinylpyrrolidone as a constituent monomer, copolymers obtained from vinylpyrrolidone as an essential constituent monomer, and chitosan and derivatives thereof can be incorporated in addition to the above-described essential components. These additives may be added either singly or in combination. According to a study by the present inventors, the additional incorporation of these components can provide the conductive material with improved dispersibility in the coating formulation, and moreover, allows them to function as additional film-forming components and hence brings about an advantageous effect that the formation of still better coating films becomes feasible.

The homopolymer (polyvinylpyrrolidone) obtained from vinylpyrrolidone as a constituent monomer and usable in the present invention is a nonionic polymer having high safety. Various products are available from the market under trade names such as, for example, "POLYVINYLPYRROLIDONE K-30", "POLYVINYLPYRROLIDONE K-85" and "POLYVINYLPYRROLIDONE K-90" (products of Nippon Shokubai Co., Ltd.) and "PITZCOL" (product of Dai-ichi Kogyo Seiyaku Co., Ltd.), and are usable. The polymers produced from vinylpyrrolidone as the constituent monomer can be any copolymers insofar as they are copolymers of vinylpyrrolidone and monomers containing one or more copolymerizable vinyl groups. Illustrative are copolymers of vinylpyrrolidone and vinyl monomers such as and vinyl pyrrolidone acrylic acid, methacrylic acid, alkyl acrylates such as methyl acrylate and ethyl acrylate, alkyl methacrylates such as methyl methacrylate and ethyl methacrylate, aminoalkyl acrylates such as diethylaminoethyl acrylate, aminoalkyl methacrylates, monoesters of acrylic acid and glycols such as hydroxyethyl acrylate, monoesters of methacrylic acid and glycols such as hydroxyethyl methacrylate, alkali metal salts of acrylic acid, alkali metal salts of methacrylic acid, the ammonium salt of acrylic acid, the ammonium salt of methacrylic acid, the quaternary ammonium derivatives of aminoalkyl acrylates, the quaternary ammonium derivatives of aminoalkyl methacrylates, vinyl methyl ether, vinyl ethyl ether, vinyl acetate, N-vinylimidazole, N-vinylacetamide, N-vinylformamide, N-vinylcaprolactam, N-vinylcarbazole, acrylamide, methacrylamide, N-alkylacrylamides, and N-methylolacrylamide. As these polymers obtained from vinylpyrrolidone as a constituent monomer, various polymers are available from the market, for example, under trade names of "RUBISCOL VAP" (vinylpyrrolidone/vinyl acetate/vinyl propionate copolymer, product of BASF SE), "RUBISET CAP" (vinyl acetate/crotonic acid/vinylpyrrolidone copolymer, product of BASF SE), "RUBIFLEX" (vinylpyrrolidone/acrylate copolymer, product of BASF SE), "GAFQUAT" (quaternized product of vinylpyrrolidone/dimethylaminoethyl methacrylate, product of International Specialty Products, Inc.), "RUBICOTE" (methylvinylimidazolium chloride/vinylpyrrolidone copolymer, product of BASF SE), "RUBISCOL VA" (vinylpyrrolidone/vinyl acetate copolymer, product of BASF SE), "COPOLYMER 937" (vinylpyrrolidone/dimethylaminoethyl methacrylate copolymer, product of International Specialty Products, Inc.), "COPOLYMER VC713" (vinylcaprolactam/vinylpyrrolidone/dimethylaminoethyl methacrylate copolymer, product of International Specialty Products, Inc.), and the like, and are usable.

Chitosan and chitosan derivatives for use in the present invention are available from the market, and can be used as they are. From the standpoint of solubility in the water-based medium, the chitosan derivatives are more preferred. Examples of the chitosan derivatives include hydroxyethyl chitosan, hydroxypropyl chitosan, hydroxybutyl chitosan, hydroxybutyl hydroxypropyl chitosan, carboxymethyl chitosan, succinyl chitosan, glycerylated chitosan, cationized chitosan, and the like.

When the coating formulation is assumed to be 100 parts by mass, the content of a vinylpyrrolidone-based polymer and/or chitosan-based polymer may preferably be from 0.1 to 20 parts by mass. A content of the vinylpyrrolidone-based polymer and/or chitosan-based polymer smaller than 0.1 parts by mass is so little that the above-described advantageous effects available from their or its addition can be hardly brought about. A content of the vinylpyrrolidone-based polymer and/or chitosan-based polymer greater than 20 parts by mass, on the other hand, involves another potential problem that the resulting coating film layer may be provided with lowered oxidation resistance. Contents of the vinylpyrrolidone-based polymer and/or chitosan-based polymer outside the above-described corresponding ranges are not preferred accordingly.

(5) Water-Based Medium

A description will now made about the water-based medium for use in the coating formulation according to the present invention. In the present invention, a water-based medium containing at least water as a polar solvent is used. Usable examples of one or more polar solvents other than water in the coating formulation include the followings: alcohols (methyl alcohol, ethyl alcohol, isopropyl alcohol, propyl alcohol, butyl alcohol, etc.), ethers (diethyl ether, diisopropyl ether, tetrahydrofuran, 1,2-dioxane, etc.), carbonates (ethylene carbonate, ethyl methyl carbonate, diethyl carbonate, dimethyl carbonate, propylene carbonate, butylene carbonate, etc.), amides (formamide, N-methyl formamide, N-ethyl formamide, N,N-dimethyl formamide, N,N-diethyl formamide, vinyl formamide, vinyl acetamide, acetamide, N-methyl acetamide, N-ethyl acetamide, N,N-dimethyl acetamide, N,N-diethyl acetamide, N-methyl-2-pyrrolidone, N-ethyl-2-pyrrolidone, vinylpyrrolidone, piperidone, N-methyl piperidone, N-ethyl piperidone, hexamethyl phosphoric triamide, 1,3-dimethyl-2-imidazolidinone, methyloxazolidinone, ethyloxazolidinone, etc.), sulfoxides (dimethyl sulfoxide, etc.), sulfones (tetramethylene sulfone, etc.), etc. Of these, more preferred are water, alcohols such as methyl alcohol, ethyl alcohol, isopropyl alcohol and propyl alcohol, and aprotic polar solvents such as N,N-dimethyl formamide, N,N-dimethyl acetamide, N-methyl-2-pyrrolidone, N-ethyl-2-pyrrolidone, 1,3-dimethyl-2-imidazolidinone and dimethyl sulfoxide. These polar solvents other than water in the water-based medium may be used either singly or in combination. As the above-described polar solvents, commercially-available common products can be used as they are, but may be used after purification as needed.

(6) Other Components

The coating formulation according to the present invention can also contain one or more optional components other than the above-described components, for example, one or more of other crosslinking agents and the like. Examples of the other crosslinking agents include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate, and blocked isocyanate compounds formed by blocking such isocyanate compounds with blocking agents such as phenols, alcohols, active methylene compounds, mercaptans, acidamides, imides, amines, imidazoles, ureas, carbamic acids, imines, oximes or sulfites; and aldehyde compounds such as glyoxal, glutaraldehyde, and dialdehyde starch.

Also included are (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; and metal alkoxide compounds such as aluminum trimethoxide, aluminumtributoxide, titanium tetraethoxide, titanium tetrabutoxide, zirconium tetrabutoxide, aluminum dipropoxide acethylacetonate, titanium dimethoxide bis (acetylacetonate) and titanium dibutoxide bis(ethylacetoacetate).

Further included are silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; and carbodiimide compounds and the like. The use of these crosslinking agents is not essential. When they are used, however, the content of one or more of such crosslinking agents may suitably range from 0.01 to 200 parts by mass based on the PVA-based resin employed as a resin binder.

(7) Preparation Method, Etc.

A description will now be made about a specific method for the preparation of the coating formulation according to the present invention. The coating formulation can be prepared by first adding the PVA-based resin as a resin binder, the conductive material and the polybasic acid or the like, and if necessary, further adding the vinylpyrrolidone-based polymer or chitosan-based polymer to the water-based medium such that they are proportioned as described above, and mixing and dispersing them. Upon conducting the mixing and dispersion, it is possible to use, as a physical processing means, a conventionally-known disperser such as a homogenizer, beads mill, ball mill, sand mill or roll mill or a conventionally-known kneader such as a planetary mixer as needed.

The coating formulation according to the present invention can be prepared as described above. It is, however, preferred to apply physical processing before coating. The physical processing can be performed by processing the coating formulation with a conventionally-known physical processing means before application. The physical processing means can be a processing means that makes use of, for example, a beads mill, ball mill, sand mill, pigment disperser, mix-muller, ultrasonic disperser, homogenizer, planetary mixer, Hobart mixer, or the like.

As a specific method of the physical processing applied to the coating formulation according to the present invention, the physical processing can be practiced as will described below. In the case of a beads mill, for example, zirconia-made beads (diameters: 0.03 to 3 mm) are filled at a filling ratio of from 50 to 95% in a ceramic-made vessel, and dispersion treatment is then performed at a rotor rim speed of from 5 to 20 m/s batchwise or in a successive cyclic manner.

The coating film formed from the coating formulation according to the present invention may preferably be such that a 1 μm thick dry coating film obtained by drying the coating formulation with air of 60° C. is soluble in boiling water and satisfies a relationship of $((X-Y)/X) \times 100 \leq 5\%$ where X indicates amass of a coating film after the dry coating film has been heated further at 150° C. or higher for 30 minutes or longer and Y designates amass of a coating film after the coating film subsequent to the heating has been boiled for 10 minutes in boiling water.

Further, the coating formulation according to the present invention may preferably have a viscosity at 25° C. of from 100 to 10,000 mPa·s when measured at a rotational speed of 60 rpm by a Brookfield rotational viscometer with a rotor number of from 1 to 4, and a pH of 6 or lower when measured at 25° C. after the coating formulation has been diluted with distilled water of the same weight.

The coating formulation according to the present invention may preferably be prepared such that a coating film formed from the coating formulation has a surface resistivity of 3,000Ω/□ or lower. The surface resistivity can be measured in accordance with JIS K 7194 by forming the coating film with a thickness of 4 μm on a glass plate, heating it at 200° C. for 1 minute, and then cooling it to 30° C.

<Electrode Plate for Electricity Storage Device>

The electrode plate according to the present invention for the electricity storage device is characterized in that between a collector and an electrode active material layer (electrode layer), a coating film layer has been formed and arranged as an undercoat layer by using the above-described coating formulation according to the present invention. The coating film layer hence contains, as essential components, the polymers including the PVA-based resin as a resin binder, the polybasic acid or the like, and the conductive material. A description will hereinafter be made about the electrode plate according to the present invention for the electricity storage device.

The coating film layer may preferably have a surface resistivity of 3,000Ω/□ or lower as measured by the above-described method. Described specifically, if a coating film having a surface resistivity higher than 3,000Ω/□ is used in an electrode plate, the internal resistance increases, thereby making it difficult to obtain a high-efficiency and long-life, cell or capacitor. It is, therefore, preferred in the present invention to control the surface resistivity of the coating film layer at 3,000Ω/□ or lower, more desirably 2,000Ω/□ or lower.

(Measurement of Surface Resistivity)

The surface resistivity that specifies each coating film in the present invention can be measured by such a method as will be described next. After a coating formulation for the formation of a coating film in the present invention is applied onto a glass plate, the coating formulation is dried at 200° C. for 1 minute to form the coating film (dry film thickness: 4 μm). The surface resistivity of the coating film was then determined by the four-point probe method in accordance with JIS K 7194. In the present invention, the measurement was conducted under conditions of 25° C. and 60% relative humidity by using a "LORESTA-GP MCP-T610" (manufactured by Mitsubishi Chemical Analytech Co., Ltd.).

The coating formulation for the formation of the coating film in the present invention contains at least the PVA-based resin, the polybasic acid or the like and the conductive material as essential components in the polar solvent as described above, and is used by further adding one or more of other resins containing hydroxyl groups and/or amino groups such as (co) polymers obtained from vinylpyrrolidone as an essential constituent monomer, chitosan and chitosan derivatives.

As the polybasic acid or the like for use in the present invention, a polybasic acid itself or an acid anhydride thereof is used. Also usable are salts, notably ammonium salts and amine salts of some or all of the carboxyl groups of polybasic acids; alkyl esters, amides, imides and amide-imides of some or all of the carboxyl groups of polybasic acids; derivatives obtained by modifying ones or more of the carboxyl groups of these compounds with N-hydroxysuccinimide, N-hydroxysulfosuccinimide or a derivative thereof; and the like. Preferred as the derivatives of these polybasic acids are compounds which regenerate the polybasic acids upon heating of coating film layers to be formed subsequently.

A description will hereinafter be made about the production method of an electrode plate according to the present invention for an electricity storage device. In the production of the electrode plate according to the present invention, a coating film is formed and arranged as an undercoat layer, for example, between a collector and an electrode by using the coating formulation of the present invention. As the collector useful in the production of the electrode plate, for example, as a positive electrode collector, aluminum, tantalum, niobium, titanium, hafnium, zirconium, zinc, tungsten, bismuth, antimony or the like can be mentioned, and as a negative electrode collector, a metal foil of copper or the like can be mentioned.

As a positive electrode collector, aluminum is preferred as it has excellent corrosion resistance to the electrolyte, is light weight, and permits easy machining. Concerning the thickness of the metal foil, one having a thickness of from 5 to 30 μm or so, preferably one having a thickness of from 8 to 25 μm or so is employed. Such a collector may be treated beforehand at a surface thereof with a silane-based, titanate-based, aluminum-based or like coupling agent.

The coating film layer can be obtained as an undercoat layer by applying the coating formulation of the present invention onto the surface of the collector in a range of from 0.1 to 10 μm, preferably from 0.1 to 5 μm, more preferably from 0.1 to 2 μm in terms of dry thickness by using one of various coating methods, and subsequently by drying the thus-applied coating formulation under heat. As such various coating methods, methods such as gravure coating, gravure reverse coating, roll coating, Meyer bar coating, blade coating, knife coating, air knife coating, comma coating, slot die coating, slide die coating and dip coating can be used. If the thickness of the coating film is smaller than 0.1 μm, uniform coating is difficult. A thickness greater than 10 μm, on the other hand, may provide the resulting coating film with reduced flexibility.

In the production of the electrode plate, the coating formulation of the present invention is applied on the collector, and the coating formulation is subjected to drying under heat after or while eliminating the medium under heat. Upon drying under heat, the coating film layer may be heated preferably at 100° C. or higher but 250° C. or lower for 1 second or longer but 60 minutes or shorter to have the polymers, which includes the PVA-based resin as a resin binder, fully crosslinked so that the adhesiveness of the resulting coating film layer as the undercoat layer to the collector and the electrochemical stability of the resin binder, to the electrolyte can be improved. A heat treatment condition of lower than 100° C. or shorter than 1 second may fail to provide the undercoat layer with satisfactory adhesiveness to the collector and also to provide the resin binder with satisfactory electrochemical stability to the electrolyte.

In addition, an electrode layer is applied over the coating film layer, which has been formed as the undercoat layer by conducting coating and drying processing as described above, to form an elect rode plate. To further improve its uniformity, it is also preferred to form the electrode plate according to the present invention by applying pressing treatment to the electrode layer while using metal rolls, heating rolls, a sheet press or the like. As a pressing condition for the pressing treatment, a pressing condition in a range of from 500 to 7,500 kgf/cm$^2$ is preferred because a press pressure of lower than 500 kgf/cm$^2$ can hardly provide the electrode layer with uniformity while a press pressure of higher than 7,500 kgf/cm$^2$ may break the electrode plate itself including the collector.

In the electrode plate of the present invention obtained as described above, the undercoat layer is formed and arranged between the collector and the electrode layer. This undercoat layer is made of the adequately dispersed, conductive material and the polymers such as the PVA-based resin as the resin binder crosslinked by the polybasic acid or the like, is excellent in adhesiveness, and has flexibility. The undercoat layer is equipped with such properties as described above.

(Secondary Cell)

Using the positive and negative electrode plates of the present invention produced as described above, a secondary cell such as a nonaqueous electrolyte secondary cell can be manufactured. When manufacturing, for example, a lithium-based, nonaqueous, secondary lithium ion cell, a nonaqueous electrolyte with a lithium salt dissolved as a solute in an organic solvent or ionic liquid is used as an electrolyte. Usable examples of the lithium salt as the solute that forms the nonaqueous electrolyte include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

As the organic solvent used in the above-mentioned manufacture, a cyclic ester, a linear ester, a cyclic ether, a linear ether or the like can be mentioned. Illustrative of the cyclic ester are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear ester are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ether are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ether are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid is a liquid formed solely of ions consisting of organic cations and anions in combination. The organic cations can be, for example, at least one kind of organic cations of dialkylimidazolium cations such as 1-ethyl-3-methylimidazolium ions, trialkylimidazolium cations such as 1,2-dimethyl-3-propylimidazolium ions, tetraalkylammonium ions such as dimethylethylmethoxyammonium ions, alkylpyridinium ions such as 1-butylpyridinium ions, dialkylpyrrolidinium ions such as methylpropylpyrrolidinium ions, and dialkylpiperidinium ions such as methylpropylpiperidinium ions.

As the anions to be paired with these organic cations, $AlCl_4^-$, $PF_6^-$, $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO: triflate anions), $(CF_3SO_2)_2N^-$ (TFSI: trifluoromethanesulfonyl), $(FSO_2)_2N^-$ (FSI: fluorosulfonyl), $(CF_3SO_2)_3C^-$ (TFSM), or the like can be used. It is to be noted that the remaining construction of the cell is the same as in the conventional art.

(Capacitor)

A description will hereinafter be made about a case in which coating film layers formed from the coating formulation of the present invention are used in the production of electrode plates for a capacitor and the capacitor. The coating films for the electrode plates of the capacitor contain the polymers such as the above-described PVA-based resin, the polybasic acid or the like, and the conductive material. As the capacitor to be manufactured using the coating formulation of the present invention, an electric double-layer capacitor or lithium ion capacitor can be mentioned.

The content of the polymers as resin binders in the coating formulation used for the formation of the coating films upon their application in the production of the electrode plates for the capacitor may be preferably from 1 to 40 parts by mass, more preferably from 1 to 20 parts by mass, still more preferably from 5 to 10 parts by mass in terms of solids content per 100 parts by mass of the coating formulation. An unduly low content of the polymers makes the components of each coating film easier to fall off from the coating film layer, while an excessively high content of the polymers involves a potential problem in that the conductive material may be covered under the polymers to provide the electrode plate with an increased internal resistance.

As the polybasic acid or the like, the above-mentioned, tribasic or higher polybasic acid or acid anhydride thereof is preferred from the standpoint of the crosslinking ability for the polymers used as resin binders. This polybasic acid is used by mixing it in the coating formulation. The content of the polybasic acid or the like in the coating formulation to be used upon formation of each coating film may be preferably from 1 to 300 parts by mass, with from 10 to 200 parts by mass being more preferred, per 100 parts by mass of the polymers. If the content of the polybasic acid or the like is lower than 1 parts by mass, the crosslinked polymer is provided with a low crosslink density, and the resulting coating film layer may be insufficient in the adhesiveness to the collector and the crosslinked polymer may be insufficient in insolubility, non-swellability and electrochemical stability to the electrolyte. On the other hand, a content higher than 300 parts by mass provides the resulting film or coating film layer with reduced flexibility and moreover, is uneconomical.

As the conductive material to be incorporated in the coating formulation to be used upon production of the electrode plates for the capacitor, a conductive carbon such as acetylene black, Ketjenblack, carbon black, carbon nanofibers or carbon nanotubes is used. The use of such a conductive material can provide each coating film with still improved electrical contact and to provide the capacitor with a reduced internal resistance and an increased capacity density. The content of the conductive material in the preparation of the coating formulation may range generally from 0.1 to 20 parts by mass, preferably from 2 to 15 parts by mass per 100 parts by mass of the coating formulation.

As the coating formulation to be used upon production of the electrode plates for the capacitor, one prepared by mixing a solution of the polymers such as the EVA-based resin, the polybasic acid or the like, the conductive material and other additives is used. It is, however, preferred to subject the coating formulation to processing by a physical processing means as needed. As the physical processing means, it is possible to use a processing means that makes use of a beads mill, ball mill, sand mill, pigment disperser, mix-muller, ultrasonic disperser, homogenizer, planetary mixer, Hobart mixer, or the like. Also preferred is a method that first mixes the conductive material by using a mixer such as a mix-muller, planetary mixer, Henschel mixer or omni-mixer, adds the solution of the polymers as resin binders, and then mixes them until homogeneous. The adoption of this method can readily prepare a uniform coating formulation, thereby making it possible to obtain still better capacitor electrode plates.

The capacitor electrode plate according to the present invention is obtained by forming with the coating formulation a coating film layer between a collector and an electrode layer to arrange the coating film layer as an undercoat layer. As the collector, a material having electrical conductivity and electrochemical durability can be used. From the viewpoint of the possession of heat resistance, a metal material such as aluminum, titanium, tantalum, stainless steel, gold or platinum is preferred, with aluminum or platinum being particularly preferred. No particular limitation is imposed on the shape of the collector. In general, however, a sheet-shaped collector having a thickness of from 0.001 to 0.5 mm or so can be employed.

No particular limitation is imposed on the forming method of the coating film layer. Preferred is a method that applies the coating formulation for the capacitor electrode between the collector and the electrode layer, and then dries the coating formulation to form the coating film layer between the collector and the electrode layer. As an application method of the coating formulation, a method such as, for example, doctor blade coating, dip coating, reverse roll coating, direct roll coating, gravure coating, extrusion coating, brush coating or spray coating can be mentioned.

The viscosity of the coating formulation to be used in the above-described formation of the coating film layer may be generally from 10 to 100,000 mPa·s, preferably from 50 to 50,000 mPa·s, more preferably from 100 to 20,000 mPa·s, although it differs depending on the type of the coating machine and the layout of the coating line. No particular limitation is imposed on the amount of the coating formulation to be applied. In general, however, the coating formulation may be applied in such an amount that the coating film layer to be formed subsequent to the elimination of the solvent by drying will have a thickness of usually from 0.05 to 100 µm, preferably from 0.1 to 10 µm. The drying method and drying conditions for the coating film layer are similar to those described above in connection with the cell electrode plates.

The capacitor, for example, electric double-layer capacitor or lithium ion capacitor according to the present invention, which has the above-described electrode plates, can be manufactured in a usual manner by using parts such as the above-described electrode plates, electrolyte and separator. Described specifically, it can be manufactured, for example, by stacking the electrode plates together with the separator interposed therebetween, rolling or folding the resultant stack into a form conforming to the capacitor, placing the rolled or folded stack in a can, filling the electrolyte into the can, and sealing the can.

The electrolyte may preferably be, but is not limited particularly to, a nonaqueous electrolyte with an electrolyte dissolved in an organic solvent. As an electrolyte for an electric double-layer capacitor, for example, any electrolyte known to date can be used. Illustrative are tetraethylammonium tetrafluoroborate, triethylmonomethylammonium tetrafluoroborate, tetraethylammonium hexafluorophosphate, and the like. As an electrolyte for a lithium ion capacitor, on the other hand, a lithium salt such as LiI, LiClO$_4$, LiAsF$_6$, LiBF$_4$ or LiPF$_6$ can be mentioned.

No particular limitation is imposed on the solvent (electrolyte solvent) for dissolving such an electrolyte, insofar as it is commonly employed as an electrolyte solvent. Specific examples include carbonates such as propylene carbonate, ethylene carbonate and butylene carbonate; lactones such as γ-butyrolactone; sulfolanes; and nitriles such as acetonitrile. They can be used either singly or as a mixed solvent of two or more of them. Among these, carbonates are preferred for their high withstand voltage. The concentration of the electrolyte may be generally 0.5 mole/L or higher, preferably 0.8 mole/L or higher.

As the separator, a known separator can be used such as a microporous membrane or nonwoven fabric made of a polyolefin such as polyethylene or polypropylene; or a porous membrane made of pulp as a primary raw material and generally called "electrolytic capacitor paper". The separator may also be formed by dispersing inorganic ceramic powder and a resin binder in a solvent, coating the resultant dispersion onto an electrode layer, and then drying the coating. A solid electrolyte or gel electrolyte may also be used instead of the separator. As other materials such as the can, those employed in usual capacitors are all usable.

EXAMPLES

The present invention will next be described more specifically based on examples and comparative examples. It is to be noted that all designations of "parts" or "%" in the following examples and comparative examples are on a mass basis. It is also to be noted that the present invention shall not be limited by these examples.

<Preparation of Polymer Solutions for Various Coating Formulations>

The compositions of the polymer solutions for the various coating formulations employed in the examples and comparative examples are shown in Table 1. Concerning the individual components used in the polymer solutions for the coating formulations, the following abbreviations are used: PVA for polyvinyl alcohol, EVOH for ethylene-vinyl alcohol copolymer, and PVP for polyvinylpyrrolidone. With respect to the components used as polybasic acids, the following abbreviations are used: PTC for 1,2,3-propanetricarboxylic acid, and BTC for 1,2,3,4-butanetetracarboxylic acid. As to the organic solvents, on the other hand, the following abbreviations are used: MeOH for methyl alcohol, EtOH for ethyl alcohol, IPA for isopropyl alcohol, and NMP for N-methyl-2-pyrrolidone.

Sample 1-1

After unmodified PVC ["KURARAY POVAL 117" (saponification degree: 99%, polymerization degree: 1,700), product of Kuraray Co., Ltd.] (10 parts) and BTC (5 parts) were added to deionized water (85 parts), the resulting mixture was stirred at 95° C. for 2 hours to achieve dissolution so that a polymer solution (100 parts) was prepared for a coating formulation.

Samples 1-2 to 1-18

Polymer solutions, which were to be used for coating formulations in the present invention, were prepared in a similar manner as in Sample 1-1 except that the kind and mass of the unmodified and/or modified PVA, the kind and mass of the unmodified and/or modified EVOH, the kind and mass of the vinylpyrrolidone-based polymer and/or chitosan-based polymer and the kind and mass of the water-based medium were varied correspondingly as shown in Table 1.

TABLE 1

Compositions of Polymer Solutions for Various Coating Formulations

| | Unmodified/modified PVA unmodified/modified EVOH | | | Vinylpyrrolidone-based polymer/chitosan-based polymer | | Polybasic acid | | Water-based medium | | |
|---|---|---|---|---|---|---|---|---|---|---|
| Sample | Kind | Saponification deg. (%) | Parts | Kind | Parts | Kind | Parts | Water Parts | Organic solvent Kind | Parts |
| 1-1 | Unmodified PVA | 99 | 10 | — | — | BTC | 5 | 85 | — | — |
| 1-2 | Unmodified PVA | 99 | 5 | PVP | 2 | BTC | 4 | 79 | MeOH | 10 |

TABLE 1-continued

Compositions of Polymer Solutions for Various Coating Formulations

| | Unmodified/modified PVA unmodified/modified EVOH | | | Vinylpyrrolidone-based polymer/chitosan-based polymer | | Polybasic acid | | Water | Water-based medium Organic solvent | |
|---|---|---|---|---|---|---|---|---|---|---|
| Sample | Kind | Saponification deg. (%) | Parts | Kind | Parts | Kind | Parts | Parts | Kind | Parts |
| 1-3 | Unmodified PVA | 99 | 5 | Chitosan | 2 | Citric acid | 5 | 83 | EtOH | 5 |
| 1-4 | Unmodified PVA | 99 | 10 | Glycerylated chitosan | 5 | Pyromellitic acid | 5 | 75 | IPA | 5 |
| 1-5 | Unmodified PVA | 95 | 15 | Hydroxyethyl-chitosan | 4 | PTC | 5 | 66 | NMP | 10 |
| 1-6 | Unmodified PVA | 88 | 10 | Hydroxypropyl-chitosan | 4 | Citric acid | 10 | 76 | — | — |
| 1-7 | Unmodified PVA | 80 | 5 | Hydroxybutyl-chitosan | 3 | Trimellitic acid | 3 | 84 | MeOH | 5 |
| 1-8 | Unmodified PVA | 74 | 5 | Cationized chitosan | 2 | Pyromellitic anhydride | 2 | 21 | NMP | 70 |
| 1-9 | Cation-modified PVA | 87 | 10 | Glycerylated chitosan | 2 | BTC | 5 | 83 | — | — |
| 1-10 | Acetoacetyl-modified PVA | 99 | 10 | Glycerylated chitosan | 3 | BTC | 5 | 82 | — | — |
| 1-11 | Unmodified PVA | 99 | 10 | Vinyl acetate-vinylpyrrolidone copolymer | 2 | Pyromellitic acid | 3 | 80 | EtOH | 5 |
| 1-12 | Unmodified PVA | 99 | 5 | Styrene-vinylpyrrolidone copolymer | 2 | Pyromellitic acid | 3 | 85 | IPA | 5 |
| 1-13 | Unmodified PVA | 99 | 10 | Vinylpyrrolidone-hexadecene copolymer | 2 | Pyromellitic acid | 3 | 80 | EtOH | 5 |
| 1-14 | Unmodified PVA | 99 | 3 | Vinylpyrrolidone-dimethylaminoethyl methacrylate copolymer | 1 | Pyromellitic acid | 2 | 89 | IPA | 5 |
| 1-15 | Unmodified EVOH | 100 | 10 | — | — | BTC | 5 | 45 | IPA | 40 |
| 1-16 | Unmodified EVOH | 100 | 10 | Glycerylated chitosan | 2 | BTC | 5 | 50 | IPA | 33 |
| 1-17 | Unmodified PVA | 34 | 10 | PVP | 3 | BTC | 5 | 32 | MeOH | 50 |
| 1-18 | Unmodified PVA | 99 | 10 | PVP | 3 | — | — | 87 | — | — |

Preparation of Various Conductive Coating Formulations and Evaluation of Physical Properties Example 1

A conductive coating formulation employed in this example was prepared in a manner to be described hereinafter. Acetylene black as a conductive material and the coating formulation of Sample 1-1 described above in Table 1 were stirred and mixed at a mixing ratio of 10 parts to 90 parts at a rotational speed of 60 rpm for 120 minutes in a planetary mixer to obtain the conductive coating formulation. The viscosity of the thus-obtained conductive coating formulation was measured by a Brookfield rotational viscometer (25° C., 60 rpm, rotor No. 4). The viscosity of the slurry was 2,100 mPa·s, and the solids content of the slurry was 23.5%.

Using the above-obtained coating formulation and employing, as a substrate, a collector formed of a 20 μM thick aluminum foil, the conductive coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the polymer component crosslinked, so that a coating film was formed with a dry thickness of 1 μm on the collector.

Evaluation

The coating film layer formed as described above was evaluated for adhesiveness and solubility/swellability as will be described below.

Parallel lines, which consisted of perpendicularly-intersecting 11 vertical lines and 11 horizontal lines, were drawn by a cutter at intervals of 1 mm on the coating film layer so that 100 squares were formed within 1 cm². A mending tape was applied to the surface of the coating film layer, and tape peeling was then conducted. The number of squares which were not peeled off was determined as a measure of adhesiveness to the collector. The average of 10 tests was 100 squares. The results are shown in Table 2. The coating film layer with the squares formed thereon as described above was immersed at 70° C. for 72 hours in a solution prepared by dissolving LiPF$_6$ (1 mole) as a supporting salt in a mixed solvent of EC (ethylene carbonate), PC (propylene carbonate) and DME (dimethoxyethane) combined together at a volume ratio of 1:1:2. Subsequently, the conditions of the coating film layer were visually observed and evaluated. As evaluation standards, one developed no changes was evaluated "none" under "solubility/swellability", while one with its coating film layer having been peeled or swollen was evaluated as "equipped" under "solubility/swellability". The evaluation results are indicated in Table 2.

The electrical conductivity of the coating film layer formed as described above was also evaluated as will be described below. After the coating formulation was first applied onto a glass plate by a comma roll coater, the thus-coated glass plate was dried for 1 minute in an oven controlled at 200° C. to form a conductive coating film (dry thickness: 4 μm). The surface resistivity of the resultant coating film was next determined by the four-point probe method in accordance with JIS K 7194. The measurement was conducted under the conditions of 25° C. and 60% relative humidity by using the "LORESTA-GP MCP-T610" (manufactured by Mitsubishi Chemical Analytech Co., Ltd.).

Examples 2 to 16 and Comparative Examples 1 and 2

In a similar manner as in Example 1 except that the kind and mass of the polymer solution of Sample 1-1 for the coating formulation and the kind and content of the conductive material were changed to the kinds and contents shown in Table 2, conductive coating formulations were prepared, and using the coating formulations, coating film layers were also prepared, respectively. The viscosity (25° C., 60 rpm; upon measurement, a rotor was selected as desired depending on the viscosity, and was used) of each coating formulation was measured. With respect to each coating film layer, its solubility/swellability, adhesiveness and surface resistivity were also determined by similar methods as performed in Example 1, and the evaluation results are shown in Table 2. It is to be noted that a 5% solution of polyvinylidene fluoride in NMP (PVDF solution) was used as a coating formulation in Comparative Example 3.

<Preparation of Polymer Solutions for Various Coating Formulations>

The compositions of polymer solutions for various coating formulations as employed in examples and comparative examples are shown in Table 3. The following abbreviations are used for polar solvents employed in the polymer solutions for the various coating formulations: "DMF" for N,N-dimethylformamide, "DMAc" for N,N-dimethylacetamide, and "DMI" for 1,3-dimethyl-2-imidazolidinone.

Sample 2-1

Unmodified polyvinyl alcohol ("KURARAY POVAL 420", saponification degree: 80%, polymerization degree: 2,000, product of Kuraray Co., Ltd.) (5 parts) was dispersed in DMF (92 parts). After pyromellitic anhydride (3 parts) was added to the dispersion, the resulting mixture was stirred at 50° C. for 2 hours to achieve dissolution so that a polymer solution (100 parts) for a coating formulation was prepared with the unmodified polyvinyl alcohol contained therein.

Samples 2-2 to 2-4

Polymer solutions of the present invention for coating formulations were prepared in a similar manner as in Sample 2-1 except that the kind and mass of the polymer, the kind and mass of the polybasic acid and the kind and mass of the polar solvent were varied as shown in Table 3.

TABLE 2

Characteristics of Coating Films

| | Polymer Solution for coating formulation | Kind and content (per 100 parts of conductive coating formulation) of conductive material | | Slurry viscosity (mPa·s) | Solids content (%) | Adhesiveness (average value) | Solubility/ swellability | Surface resistivity (Ω/□) |
|---|---|---|---|---|---|---|---|---|
| | | Kind | Parts | | | | | |
| Ex. 1 | Sample 1-1 | AB | 10 | 2,110 | 23.5 | 100 | None | 2,600 |
| Ex. 2 | Sample 1-2 | AB | 7 | 1,350 | 17.2 | 98 | None | 720 |
| Ex. 3 | Sample 1-3 | AB | 8 | 1,490 | 19.0 | 95 | None | 650 |
| Ex. 4 | Sample 1-4 | AB | 10 | 3,200 | 28.0 | 96 | None | 1,100 |
| Ex. 5 | Sample 1-5 | AB | 13 | 5,460 | 33.9 | 90 | None | 1,300 |
| Ex. 6 | Sample 1-6 | AB | 20 | 9,070 | 39.2 | 89 | None | 890 |
| Ex. 7 | Sample 1-7 | AB | 7 | 896 | 17.2 | 92 | None | 840 |
| Ex. 8 | Sample 1-8 | AB | 5 | 2,340 | 13.6 | 93 | None | 2,200 |
| Ex. 9 | Sample 1-9 | AB | 10 | 1,011 | 25.3 | 97 | None | 770 |
| Ex. 10 | Sample 1-10 | AB | 10 | 847 | 26.2 | 98 | None | 910 |
| Ex. 11 | Sample 1-11 | AB | 10 | 1,620 | 23.5 | 96 | None | 1,000 |
| Ex. 12 | Sample 1-12 | KB | 4 | 1,800 | 13.6 | 91 | None | 1,200 |
| Ex. 13 | Sample 1-13 | FB | 10 | 3,120 | 23.5 | 92 | None | 1,500 |
| Ex. 14 | Sample 1-14 | CNT | 3 | 620 | 8.8 | 99 | None | 340 |
| Ex. 15 | Sample 1-15 | AB | 10 | 426 | 23.5 | 100 | None | 1,900 |
| Ex. 16 | Sample 1-16 | AB | 10 | 287 | 25.3 | 99 | None | 1,100 |
| Comp. Ex. 1 | Sample 1-17 | AB | 10 | 371 | 26.2 | 95 | Equipped | 2,900 |
| Comp. Ex. 2 | Sample 1-18 | AB | 10 | 1,630 | 21.7 | 32 | Equipped | 3,600 |
| Comp. Ex. 3 | PVDF soln. | AB | 5 | 2,050 | 9.8 | 41 | Equipped | 1,600 |

AB: Acetylene black ["DENKA BLACK HS-100", product of Denki Kagaku Kogyo Kabushiki Kaisha]
KB: Ketjenblack ("ECP600JD", product of Lion Corporation)
FB: Furnace black ("#3050B", product of Mitsubishi Chemical Corporation)
CNT: Carbon nanotubes (multilayer type, diameter: 40 to 60 nm, length: 1 to 2 μm., product of Tokyo Chemical Industry Co., Ltd.)

TABLE 3

Compositions of Polymer Solutions for Coating Formulations

| | Unmodified/modified PVA unmodified/modified EVOH | | Polybasic acid | | Polar solvent | |
|---|---|---|---|---|---|---|
| | Kind | parts | Kind | parts | Kind | parts |
| Ex. 2-1 | Unmodified polyvinyl alcohol | 5 | Pyromellitic anhydride | 3 | DMF | 92 |
| Ex. 2-2 | Modified polyvinyl alcohol | 5 | Trimellitic anhydride | 2 | DMAc | 93 |
| Ex. 2-3 | Ethylene-vinyl alcohol copolymer | 6 | Pyromellitic acid | 3 | DMI | 91 |
| Ex. 2-4 | Unmodified polyvinyl alcohol | 5 | — | — | Water | 95 |

Unmodified polyvinyl alcohol: "KURARAY POVAL 420" (saponification degree: 80%, polymerization degree: 2,000, product of Kuraray Co., Ltd.)
Modified polyvinyl alcohol: "GOHSERAN L-0302" (sulfonic-modified PVA, saponification degree: 43.5 to 49.5, product of Nippon Synthetic Chemical Industry Co., Ltd.)
Ethylene-vinyl alcohol copolymer: "EVALG156A" (copolymerized ethylene content: 48 mole %, saponification degree: 99% or higher, product of Kuraray Co., Ltd.

Preparation of Coating Formulations and Coating Films and Evaluation of Coating Films Referential Example 1

A coating formulation containing a conductive material and used in this referential example was prepared in a manner to be described hereinafter. Acetylene black as the conductive material and the polymer solution of Sample 2-1 for the coating formulation as described above in Table 3 were stirred and mixed at a mixing ratio of 7 parts to 93 parts at a rotational speed of 60 rpm for 120 minutes in a planetary mixer to obtain a slurry-form coating formulation.

Using the coating formulation obtained as described above and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C., and was further dried for 2 minutes in the oven controlled at 180° C. to eliminate the solvent and to have the polymer component crosslinked, so that a coating film was formed with a dry thickness of 1 μm on the collector.

Parallel lines, which consisted of perpendicularly-intersecting 11 vertical lines and 11 horizontal lines, were drawn by a cutter at intervals of 1 mm on the coating film layer obtained as described above so that 100 squares were formed within 1 cm². A mending tape was applied to the surface of the coating film layer, and tape peeling was then conducted. The number of squares which were not peeled off was determined as a measure of adhesiveness to the collector. The average of 10 tests was 99.0 squares. The coating film layer with the squares formed thereon as described above was immersed at 70° C. for 72 hours in a solution prepared by dissolving LiPF$_6$ (1 mole) as a supporting salt in a mixed solvent of EC (ethylene carbonate), PC (propylene carbonate) and DME (dimethoxyethane) combined together at a volume ratio of 1:1:2. Further, the conditions of the coating film layer after the immersion were observed. One developed no changes is indicated as "none" under "solubility/swellability", while one with its coating film layer having been peeled or swollen is indicated as "equipped" under "solubility/swellability".

Also to evaluate the electrical conductivity of the coating film layer, the coating formulation was applied onto a glass plate by a comma roll coater, and the thus-coated glass plate was then dried for 1 minute in an oven controlled at 200° C. to form a conductive coating film (dry thickness: 4 μm).

The surface resistivity of the resultant coating film was determined by the four-point probe method in accordance with JIS K 7194. The measurement was conducted under the conditions of 25° C. and 60% relative humidity by using the "LORESTA-GP MCP-T610" (manufactured by Mitsubishi Chemical Analytech Co., Ltd.).

Referential, Examples 2 and 3 & Comparative Examples 4 and 5

Coating films were prepared in a similar manner as in Referential Example 1 except that the polymer solutions for coating formulations as described below in Table 4 were used respectively in place of the polymer solution of Sample 2-1 for the coating formulation in Referential Example 1. The adhesiveness, solubility/swellability and surface resistivity of each resulting coating film were then determined in a similar manner as in Referential Example 1, and the results described below in Table 4 were obtained. It is to be noted that a styrene-butadiene copolymer latex (with the use of sodium carboxymethylcellulose as a thickener) was used in Comparative Example 5.

TABLE 4

Preparation and Evaluation of Coating Films

| | Polymer solution for coating formulation | Content* | Adhesiveness (av. value) | Solubility/ Swellability | Surface resistivity (Ω/□) |
|---|---|---|---|---|---|
| Ref. Ex. 1 | Sample 2-1 | 4 | 99 | None | 730 |
| Ref. Ex. 2 | Sample 2-2 | 5 | 93 | None | 690 |
| Ref. Ex. 3 | Sample 2-3 | 2 | 90 | None | 460 |
| Comp. Ex. 4 | Sample 2-4 | 5 | 66 | Equipped | 1100 |
| Comp. Ex. 5 | SBR + CMC dispersion | 3 | 95 | Equipped | 460 |

SBR: Styrene-butadiene copolymer latex ("NALSTAR SR-112", product of Nippon A & L Inc.)
CMC: Sodium carboxymethylcellulose ("SUNROSE F-600LC", product of Nippon Paper Chemicals Co., Ltd.)
*Content of resin per 100 parts of coating formulation (parts: solids content)

Example 17

Positive Electrode Plate, Negative Electrode Plate, Cell)

Positive Electrode Plate

A positive electrode formulation with a positive-electrode active material contained therein was prepared in a manner to be described hereinafter. As materials for the positive electrode formulation, LiCoO$_2$ powder having particle sizes of from 1 to 100 μm, acetylene black as a conductive aid and the 5% solution of polyvinylidene fluoride as a binder in NMP (the PVDF solution) were used at a mixing ratio of 90 parts, 5 parts and 50 parts. They were then stirred and mixed at a rotational speed of 60 rpm for 120 minutes in a planetary mixer to obtain a slurry-form, positive electrode formulation with the positive-electrode active material contained therein.

Using the positive electrode formulation obtained as described above, the positive electrode formulation was applied by a comma roll coater onto the surface of the coating film layer of Example 1. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 µm on the coating film layer was obtained. The positive-electrode composite layer obtained in the above-described manner was pressed under the condition of 5,000 kgf/cm$^2$ to make the layer uniform. Subsequently, aging was conducted for 48 hours in a vacuum oven controlled at 80° C. to fully eliminate volatiles (the solvent, unreacted polybasic acid, etc.) so that a positive electrode plate was obtained.

(Negative Electrode Plate)

Using the coating formulation of Example 1 and employing, as a substrate, a copper-foil collector, the coating formulation was applied onto one, side of the substrate by a comma roll coater. The thus-coated substrate was then dried for 2 minutes in an oven controlled at 110° C., and was further dried for 2 minutes in the oven controlled at 180° C. to eliminate the solvent and to have the resin binder crosslinked, so that a coating film layer was formed with a dry thickness of 1 µm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the 5% solution of polyvinylidene fluoride as a binder in NMP (the PVDF solution) were used at a mixing ratio of 90 parts, 5 parts and 50 parts. They were stirred and mixed at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was applied by a comma roll coater onto the surface of the coating film layer. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 µm on the coating film layer was obtained. The negative-electrode composite layer obtained in the above-described manner was pressed under the condition of 5,000 kgf/cm$^2$ to make the layer uniform. Subsequently, aging was conducted for 48 hours in a vacuum oven controlled at 80° C. to fully eliminate volatiles (the solvent, unreacted polybasic acid, etc.) so that a negative electrode plate was obtained.

(Cell)

An electrode unit was first formed by using the positive electrode plate and negative electrode plate, which had been obtained as described above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of LiPF$_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of cell characteristics, charge-discharge characteristics were measured under a temperature condition of 25° C. by a charge-discharge measuring instrument as will be described below. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle (charge-discharge capacity retention) was 99%.

Examples 18 to 22, Referential Example 4, and Comparative Example 6

Positive Electrode Plates, Negative Electrode Plates, Cells)

In a similar manner as in Example 17 except that the coating formulations and coating films described below in Table 5 were used in place of the coating formulation and coating film of Example 1 employed for the production of the positive electrode plate and negative electrode plate used in Example 17, electrode plates were produced and cells were manufactured. The respective cells so manufactured were measured for charge-discharge characteristics in a similar manner as in Example 17. The results are shown in Table 5.

TABLE 5

Positive Electrode Plates, Negative Electrode Plates, and Cells

| | Coating film employed for the production of positive electrode plate | Coating formulation employed for the production of negative electrode plate | Charge-discharge capacity retention |
|---|---|---|---|
| Ex. 17 | Coating film of Ex. 1 | Coating formulation of Ex. 1 | 99% |
| Ex. 18 | Coating film of Ex. 2 | Coating formulation of Ex. 2 | 96% |
| Ex. 19 | Coating film of Ex. 3 | Coating formulation of Ex. 3 | 98% |
| Ex. 20 | Coating film of Ex. 4 | Coating formulation of Ex. 4 | 97% |
| Ex. 21 | Coating film of Ex. 9 | Coating formulation of Ex. 9 | 98% |
| Ex. 22 | Coating film of Ex. 16 | Coating formulation of Ex. 16 | 99% |
| Ref. Ex. 4 | Coating film of Ref. Ex. 1 | Coating formulation of Ref. Ex. 1 | 99% |
| Comp. Ex. 6 | Coating film of Comp. Ex. 3 | Coating formulation of Comp. Ex. 3 | 83% |

Application to Capacitors

Example 23

Capacitor

Using the coating formulation of Example 1 and employing, as a substrate, a collector formed of a 20-µm thick aluminum foil, the coating formulation was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the resin binder crosslinked, so that a coating film layer was formed with a dry thickness of 0.5 μm on the collector.

An electrode formulation with an active material contained therein was next prepared in a manner to be described hereinafter. As materials for the electrode formulation, high-purity activated carbon powder (specific surface area: 1,500 m²/g, average particle size: 10 μm; 100 parts) and acetylene black (8 parts) as a conductive material were charged in a planetary mixer, and the solution of polyvinylidene fluoride in NMP was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer, followed by drying at 80° C. for 30 minutes in a fan dryer. Using a roll press, pressing was then conducted to obtain a polarizable, capacitor electrode plate having a thickness of 80 μm and a density of 0.6 g/cm³.

From the polarizable, capacitor electrode plate produced as described above, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. An electrolyte was charged into the case such that no air was allowed to remain. A 0.2-mm thick stainless steel cap was put and fixed on the case with the polypropylene-made packing interposed therebetween. The case was then sealed to manufacture a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table 6.

Examples 24 to 28

Capacitors

In a similar manner as in Example 23 except that the coating formulations described below in Table 4 were used in place of the coating formulation of Example 1 employed in Example 23, electrode plates were produced and capacitors were manufactured, and their characteristics were evaluated. The results are shown in Table 6.

Comparative Example 7

Capacitor

In a similar manner as in Example 23 except that the coating formulation of Comparative Example 3 was used in place of the coating formulation of Example 1 employed in Example 23, electrode plates were produced and a capacitor was manufactured, and its characteristics were evaluated. The results are shown in Table 6.

The internal resistances and capacitances described below in Table 6 were measured and evaluated as will be described next. With respect to each capacitor obtained, its capacitance and internal resistance were measured at a current density of 20 mA/cm², and based on Comparative Example 7 as a reference, evaluation was performed in accordance with the following evaluation standards. The greater the capacitance and the lower the internal resistance, the better the performance as a capacitor.

(Evaluation Standards for Capacitance)
A: Capacitance greater by 20% or more than Comparative Example 7.
B: Capacitance greater by 10% or more but less than 20% than Comparative Example 7.
C: Capacitance equal to or smaller than Comparative Example 7.

(Evaluation Standards for Internal Resistance)
A: Internal resistance lower by 20% or more than Comparative Example 7.
B: Internal resistance lower by 10% or more but less than 20% than Comparative Example 7.
C: Internal resistance equal to or higher than Comparative Example 7.

TABLE 6

Manufacture and Evaluation of Capacitors

| | Coating formulation employed for the production of polarizable electrode plate | Capacitance | Internal resistance |
|---|---|---|---|
| Ex. 23 | Coating formulation of Ex. 1 | B | B |
| Ex. 24 | Coating formulation of Ex. 4 | B | B |
| Ex. 25 | Coating formulation of Ex. 9 | A | A |
| Ex. 26 | Coating formulation of Ex. 12 | B | B |
| Ex. 27 | Coating formulation of Ex. 14 | A | A |
| Ex. 28 | Coating formulation of Ex. 15 | B | B |
| Comp. Ex. 7 | Coating formulation of Comp. Ex. 3 | — | — |

As evident from the above examples and comparative examples, a capacitor of large capacitance and low internal resistance can be obtained when electrode plates are produced by using coating formulations of the present invention as coating films and the capacitor is manufacture by using the electrode plates.

INDUSTRIAL APPLICABILITY

As has been described above, the present invention provides a coating formulation for an electricity storage device such as a secondary cell or capacitor, said coating formulation being equipped with excellent environmental performance and film properties and characteristics, owing to the use, as the coating formulation, of a water-based slurry, which uses as essential components the three components of (1) PVA and/or EVOH as a resin binder which does not add much load on the environment, (2) a conductive material as a filler and (3) a polybasic acid or the like having a resin-hardening function, and moreover, which contains these components in specific proportions. Further, the present invention provides electrode plates for an electricity storage device such as electrode plates for a cell or polarizable electrode plates for a capacitor, in each of which a coating film (thin film) having excellent adhesiveness to a surface of a metal material such as an aluminum material and superb solvent resistance is arranged, between a collector formed of an aluminum foil or copper foil and an electrode layer, as an undercoat having excellent adhesiveness to a surface of a metal material such as an aluminum material and superb solvent resistance layer, and therefore, the electrode is provided with excellent adhesiveness to the collector and superb electrolyte resistance and also with improved contact resistance between itself and the collector; and also provides the electricity storage device including these electrodes.

The invention claimed is:

1. A water-based coating formulation for an electrode plate of an electricity storage device, said water-based coating formulation being adapted to form a coating film layer on the electrode plate, comprising:
   in a water-based medium comprising at least water as a polar solvent,
   (1) a resin binder, which is at least one resin having a saponification degree of 40% or higher and is selected from the group consisting of unmodified polyvinyl alcohol, modified polyvinyl alcohols, unmodified ethylene-vinyl alcohol copolymer, and modified ethylene-vinyl alcohol copolymers;
   (2) an electrically conductive material;
   (3) at least one polybasic acid selected from the group consisting of 1,2,3,4-butanetetracarboxylic acid, pyromellitic acid, citric acid, ethylenediaminetetraacetic acid, 1,2,3-propanetricarboxylic acid, 1,2,4-cyclohexanetricarboxylic acid, 1,2,4,5-cyclohexanetetracarboxylic acid, trimellitic acid, 1,4,5,8-naphthalenetetracarboxylic acid, and 1,2,3,4,5,6-cyclohexanehexacarboxylic acid, or an acid anhydride thereof; and
   (4) at least one additive resin selected from the group consisting of a copolymers of vinylpyrrolidone, which have the vinylpyrrolidone as an essential constituent monomer and chitosan derivatives,
      wherein the copolymers of the vinylpyrrolidone are a vinylpyrrolidone/vinyl acetate/vinyl propionate copolymer, a vinyl acetate/crotonic acid/vinylpyrrolidone copolymer, a vinylpyrrolidone/acrylate copolymer, a quaternized product of vinylpyrrolidone/dimethylaminoethyl methacrylate, a methylvinylimidazolium chloride/vinylpyrrolidone copolymer, a vinylpyrrolidone/vinyl acetate copolymer, a vinylpyrrolidone/dimethylaminoethyl methacrylate copolymer, a vinylcaprolactam/vinylpyrrolidone/dimethylaminoethyl methacrylate copolymer, a styrene/vinylpyrrolidone copolymer, and a vinylpyrrolidone/hexadecene copolymer, and
      wherein the chitosan derivatives are hydroxyethyl chitosan, hydroxypropyl chitosan, hydroxybutyl chitosan, hydroxybutyl hydroxypropyl chitosan, carboxymethyl chitosan, succinyl chitosan, glycerylated chitosan, and cationized chitosan,
   wherein a ratio of the components of (1), (2), and (3) in the coating formulation is the resin binder (1) in an amount from 0.1 to 3 parts by mass and the polybasic acid or the acid anhydride thereof (3) in an amount from 0.01 to 6 parts by mass, both, relative to 1 part by mass of the electrically conductive material (2), and
   the coating formulation has a solid content from 0.02 mass % to 40 mass %.

2. The water-based coating formulation according to claim 1, wherein the polybasic acid is 1,2,3,4-butanetetracarboxylic acid or pyromellitic acid, or the acid anhydride thereof.

3. The water-based coating formulation according to claim 1, which has a surface resistivity of 3,000Ω/□ or lower when a coating film having a thickness of 4 μm is formed on a glass plate, heated at 200° C. for 1 minute, and cooled to 30° C., and then the surface resistivity of the coating film is measured in accordance with JIS K 7194.

4. The water-based coating formulation according to claim 1, which has a viscosity at 25° C. from 100 to 10,000 mPa·s when measured with a Brookfield rotational viscometer at a rotational speed of 60 rpm, with a rotor number from 2 to 4, at pH of 6 or lower, and at 25° C. after the coating formulation has been diluted with distilled water of same weight.

5. The water-based coating formulation according to claim 1, wherein the electrically conductive material comprises at least one carbonaceous conductive aid.

6. The water-based coating formulation according to claim 1, wherein in addition to water, the water-based medium comprises at least one medium selected from the group consisting of methyl alcohol, ethyl alcohol, isopropyl alcohol, N-methyl-2-pyrrolidone, dimethyl sulfoxide, dimethylacetamide, and N,N-dimethylforamide.

7. The water-based coating formulation according to claim 1,
   wherein a 1 μm thick dry coating film obtained by drying the coating formulation with air of 60° C. is soluble in boiling water, and satisfies a following relationship:

$$((X-Y)/X) \times 100 < 5\%$$

where X indicates a mass of a coating film after the dry coating film has been heated further at 150° C. or higher for 30 minutes or longer, and Y designates a mass of the dry coating film after the dry coating film has been boiled for 10 minutes in the boiling water subsequent to the heating.

8. An electrode plate for an electricity storage device, comprising: a collector; an electrode active material layer; and a coating film, which is formed of the water-based coating formulation according to claim 1 and is placed between the collector and the electrode active material layer.

9. The electrode plate according to claim 8, wherein the coating film has been formed by heat treatment at a temperature from 100 to 250° C., and has a thickness from 0.1 to 10 μm in terms of solid components.

10. The positive electrode plate according to claim 8, wherein the collector is an aluminum foil, and the electrode active material layer comprises a positive-electrode active material.

11. The negative electrode plate according to claim 8, wherein the collector is a copper foil, and the electrode active material layer comprises a negative-electrode active material.

12. The electrode plate according to claim 8, wherein the collector is an aluminum foil, and the electrode active material layer comprises a polarizable electrode.

13. A process for producing an electrode plate for an electricity storage device, which comprises:
   applying the water-based coating formulation according to claim 1 onto a surface of a collector so as to form a coating film; and
   then forming an electrode active material layer on the coating film.

14. The process according to claim 13, wherein upon forming the coating film, a heat treatment is conducted at 100° C. or higher but 250° C. or lower, for 1 second or longer but 60 minutes or shorter, after or during eliminating the water-based medium under heat subsequent to the application of the water-based coating formulation.

15. An electricity storage device comprising the electrode plate according to claim 8.

16. The electricity storage device according to claim 15, which is a secondary cell or a capacitor.

17. A collector comprising an undercoat layer formed on a surface of the collector by applying the water-based coating formulation according to claim 1 onto the surface of the collector and then subjecting said applied coating formulation to a heat treatment.

18. The collector according to claim 17, further comprising an electrode layer formed on the undercoat layer.

19. The water-based coating formulation according to claim 1, wherein the at least one carbonaceous conductive aid is at least one material selected from the group consisting of acetylene black, Ketjenblack, carbon nanofibers, and carbon nanotubes.

* * * * *